UNITED STATES PATENT OFFICE.

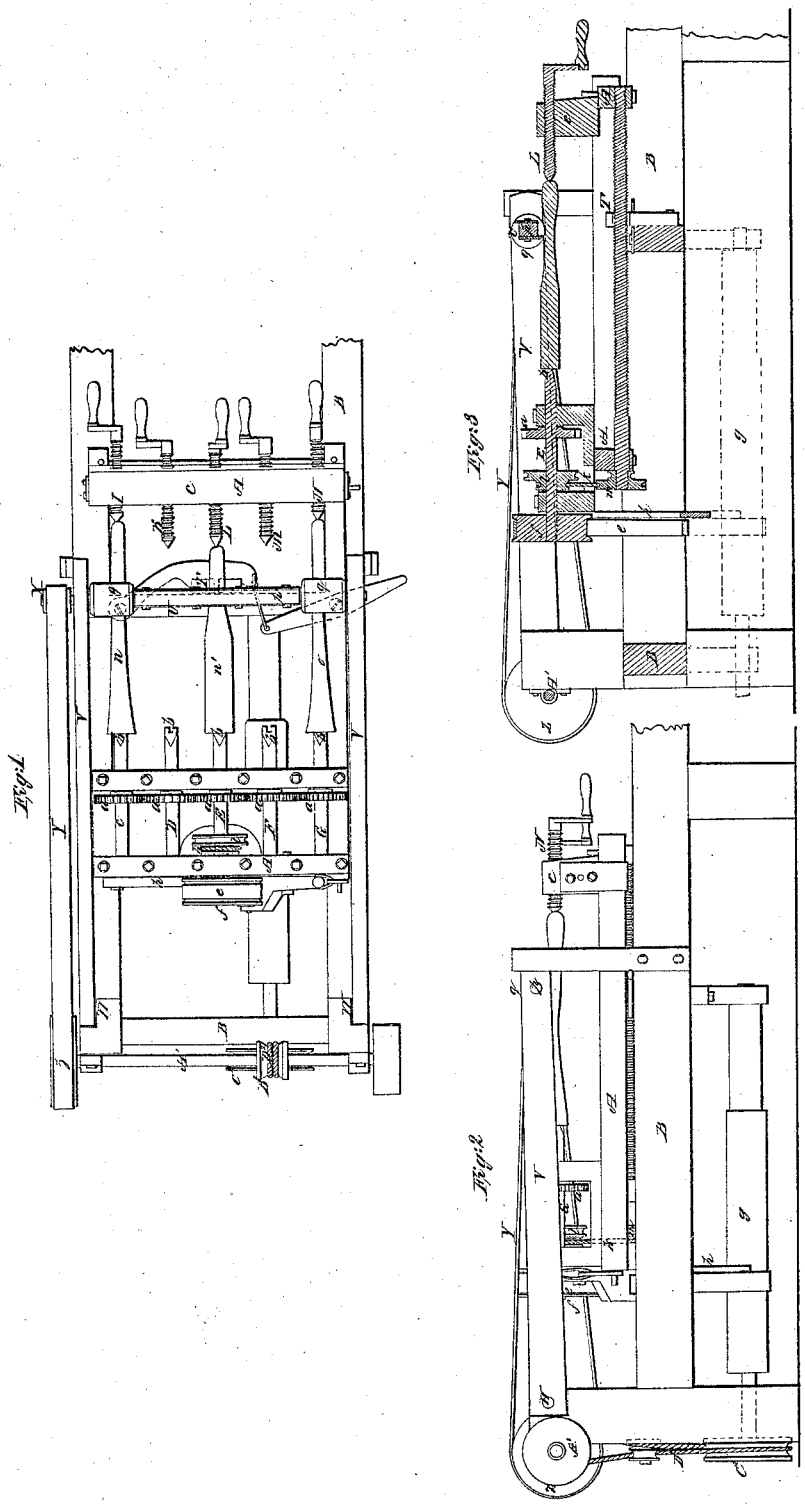

FRANK BAKER, OF PEPPERELL, MASSACHUSETTS.

LATHE FOR IRREGULAR FORMS.

Specification of Letters Patent No. 10,922, dated May 16, 1854.

*To all whom it may concern:*

Be it known that I, FRANK BAKER, of Pepperell, in the county of Middlesex and State of Massachusetts, have invented an Improved Machine for Turning Irregular Forms; and I do hereby declare that the same is fully described and represented in the following specification and the accompanying drawings, letters, figures, and references thereof.

Of the said drawings, Figure 1 denotes a top view of my improved machine. Fig. 2, a side elevation; Fig. 3, a central, vertical, and longitudinal section of it.

In my improved machine, I make use of a rectangular frame or carriage, A, which is supported and made to move longitudinally upon another frame, B. The first rectangular frame, viz., A, is intended to carry at or near one end of it a series of mandrels C, D, E, F, G, which are connected together by spur gears $a, a, a$. These several mandrels are arranged horizontally and parallel to one another, and each is provided with a suitable clutch or dog $b$. Opposite to these mandrels and in line with them respectively is a series of centering screws or points I, K, L, M, N, they being applied to the head or standard $c$ of the frame A. The central mandrel of the five is put in rotation by an endless belt, $e$, that is made to run around a pulley, $f$, (fixed on the mandrel) and a long drum $g$ arranged as seen in Figs. 2 and 3. An arm $h$ extends downward of the carriage A, and in front of the endless belt, and crowds said endless belt along on the long drum, while said carriage is being put in movement in a longitudinal direction. Such movement of the carriage is effected by a long screw S, attached to the carriage and made to revolve in a gripping nut T, affixed to the main supporting frame.

An endless band $k$ extending around a set of cone pulleys $l$ on the middle mandrel, and another set of pulleys $m$, fixed on the screw shaft serves to impart rotary motion to the screw. The two outer mandrels C, G, are intended to carry two patterns $n$, $o$, of the articles to be turned, such patterns being exactly alike. Across these patterns is to be arranged a horizontal shaft $p$, having tracer rollers $g, g$, revolving loosely upon it and respectively resting upon the two patterns $n$, $o$. The said shaft carries between the tracer rollers a cutter cylinder U, made in all respects like a common Woodworth planing machine, such cylinder being made to extend over the pieces of wood held and rotated by three mandrels D, E, F.

The shaft $p$ is supported in the front ends by two bars V, which turn vertically on fulcra W, W, placed at their opposite ends, and this shaft has a driving pulley X upon one end of it, that is put in motion by an endless band Y, that travels around said pulley and a pulley Z fixed on the driving shaft A'. The long drum hereinbefore mentioned receives its motion from the driving shaft by means of pulleys $B^2$, $C^2$, and an endless band $D^2$.

My machine contains the principles or characteristics of the image lathe, or self directed lathe, producing by one continued operation irregular forms, such image lathe being described in the *Manuel du Tourner*, (published by Hamelin Bergeron,) vol. 2, pages 424–437, 2nd edition, such characteristics being a pattern and its rotary mandrel. 2nd, a rotary mandrel and a block holder. 3rd, machinery for giving to the pattern an equal and simultaneous rotation. 4th, a tracer. 5th, a movable frame for tracer and cutter. 6th, a cutter. 7th, machinery for producing a longitudinal movement of the tracer and cutter. 8th, machinery to press or carry the cutter and tracer respectively against the block and pattern.

The well known lathe for turning irregular forms as patented by Thomas Blanchard does not differ in principle from the image lathe, as it contains all the essential elements of combination that are found in the image lathe, but operates with a rotary instead of a stationary cutter, such rotary cutter being a well known device in the arts, and a mere substitution for a stationary or fixed cutter, the differences in degrees or extent of the effects of the two kind of cutters being also well known in the arts. Each cutter although one is stationary and the other rotary, produces the same effect, viz., cutting or removing portions of the article to be turned.

Now my machine as hereinbefore described contains all the characteristics or elements of combination of the "image lathe" and a certain improvement or improvements, which I have engrafted thereon, my improvement enabling me to accomplish by my machine the turning of what are termed two right or left articles at one and the same time, and from two exactly corresponding patterns. By having two patterns and rollers, the cutter is kept much more steady and with less liability of deflection than in case but one pattern and presser were used. It is therefore made to cut smoother on the several pieces of work as its pressure on them is equalized.

I am aware that in the turning lathe of said Blanchard a right last has been turned from a left last, or a left last from a right last. I therefore do not claim such as my invention, but What I do claim as my invention is—

The particular arrangement of the cutting cylinder, the two patterns, the patterns and the work mandrels, and their tracer rollers, whereby they are made to operate together substantially as hereinbefore described.

In testimony whereof, I have hereto set my signature this third day of November, A. D. 1853.

FRANK BAKER.

Witnesses:
C. W. BELLOWS,
CATHERINE M. BELLOWS.